United States Patent [19]
Nishio et al.

[11] 3,832,512
[45] Aug. 27, 1974

[54] ELECTROSLAG WELDING PROCESS

[75] Inventors: Yasuhiro Nishio; Zenichiro Okamoto; Yoshinori Hiromoto, all of Hiroshima, Japan

[73] Assignee: Mitsubishi Jukogyo Kabushiki Kaisha, Tokyo, Japan

[22] Filed: Mar. 5, 1973

[21] Appl. No.: 337,853

[30] Foreign Application Priority Data
Mar. 8, 1972 Japan.............................. 47-23717

[52] U.S. Cl.................................. 219/73, 219/126
[51] Int. Cl............................................ B23k 25/00
[58] Field of Search......... 219/73, 74, 76, 126, 136, 219/137, 145

[56] References Cited
UNITED STATES PATENTS
| | | | |
|---|---|---|---|
| 2,191,471 | 2/1940 | Hopkins............................... | 219/76 |
| 3,575,567 | 4/1971 | Nishio et al........................... | 219/73 |
| 3,578,938 | 5/1971 | Medovar et al....................... | 219/73 |

FOREIGN PATENTS OR APPLICATIONS
| 261,613 | 5/1970 | U.S.S.R................................. | 219/73 |
|---|---|---|---|

*Primary Examiner*—J. V. Truhe
*Assistant Examiner*—Clifford C. Shaw
*Attorney, Agent, or Firm*—McGlew and Tuttle

[57] ABSTRACT

The process employs at least one metal plate electrode inserted into a welding gap between opposed surfaces of base metals to be weld united. At least that portion of the electrode length to be consumed by welding is divided into a plurality, preferably three, of substantially equal width sections spaced laterally from each other. The center section, or the center portion of the width of the electrode, has a thickness in excess of the thicknesses of the outer sections or the outer portions of the width of the electrode. All the sections of each inserted electrode are connected to the same respective single terminal of a welding power source.

4 Claims, 16 Drawing Figures

FIG. 1a PRIOR ART   FIG. 1b PRIOR ART
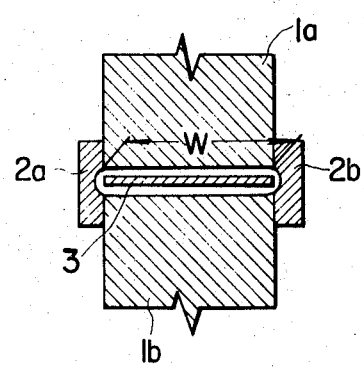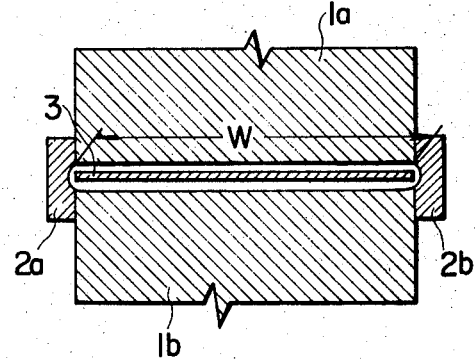
FIG. 2a PRIOR ART   FIG. 2b PRIOR ART
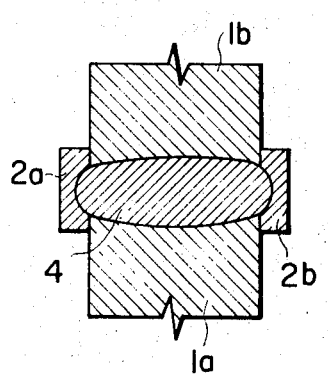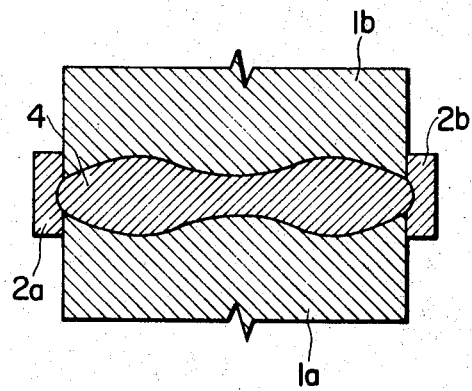
FIG. 4
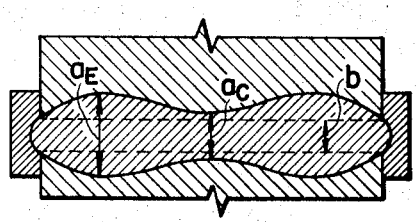

CURRENT
TIME

ELECTROSLAG WELDING PROCESS

FIELD AND BACKGROUND OF THE INVENTION

This invention relates to electroslag welding processes using a plate-type metal electrode.

In conventional electroslag welding processes using plate-shaped electrodes, welding is performed by inserting either one such electrode, hereinafter referred to as a "single electrode," or a plurality of such electrodes, hereinafter referred to as "multiple electrodes," into a welding gap or groove defined between base metals, positioned with their edges facing each other to define a suitable welding gap. In such conventional electroslag welding processes using plate-shape electrodes, regardless of the number of electrodes employed, the penetration to the base metals varies with the width of the electrode or electrodes. This is illustrated in FIGS. 1a and 1b of the accompanying drawings, these Figures being sectional views of base metals being welded by electroslag welding with single electrodes of the plate type.

In FIG. 1a, both the thickness of the base metal and the longitudinal dimension of the welding gap or groove are relatively small and, a plate electrode having a correspondingly reduced width is used. In FIG. 1b, by contrast, the base metal is relatively thick and, accordingly, the electrode has a greater width.

In either case, a plate-shaped electrode 3, which is rectangular in cross-section, is inserted into the gap formed between the facing edges of base metals 1a and 1b whose facing edges define a suitable welding gap, with the opposite ends of the gap being closed by end strips of the same material as the parent metal to be welded or water-cooled copper shoes 2a and 2b. Electroslag welding is carried out or performed in the usual manner.

In these cases, the root penetration to the base metals 1a and 1b varies with the width W of the plate electrode 3, as shown in FIG. 2a or FIG. 2b. Thus, the arrangement of FIG. 1a brings about the results shown in FIG. 2a, where the width of the deposited metal 4 shows maximum at the middle or central portion of the electrode 3 and gradually decreases on approaching both ends. In FIG. 2b, which corresponds to FIG. 1b, the width of the deposited metal shows minimum at the middle portion of the electrode 3 and attains maximum near the both ends of the welded joint.

These tendencies may be quantitatively represented, as in FIG. 3. In FIG. 3, the electrode width W, or the thickness of base metal, is plotted as the abscissa and a ratio $Q_C/Q_E$ as defined in FIG. 4 is plotted as the ordinate. In FIG. 4 the $Q_C$ which might be referred to as the penetration at the weld center is determined by the following formula: $Q_C = \frac{1}{2}(a_C - b)$ wherein $a_C$ is the width of the deposited metal and b is the ordinal distance between the base metals 1a, 1b, of FIG. 1. The $Q_E$ which might be referred to as the penetration at the weld intermediate the center and the ends of the electrode, is determined by the following formula: $Q_E = \frac{1}{2}(a_E - b)$ wherein $a_E$ is the width of the deposited metal and b is as above defined.

The results of welding with a single electrode are represented by the curve A in FIG. 3, and those with a "tri-sected electrode," which will be described hereinafter, are represented by the curve B.

To obtain these data, welding experiments were conducted under conditions which will now be described. An AC source having a drooping characteristic was used, and the plate thickness of the electrodes was 12mm. The slag or granular flux used was "Gr 90 flux," which is a trademark for flux manufactured by Hanshin Yozai Co. The welding current was 3600 A, the welding voltage was 40 V, and the slag depth was 30 mm. In the case of single electrode welding, as indicated by curve A in FIG. 3, the ratio $Q_C/Q_E$ is less than 1 with an electrode having a width of 300 mm or more. In other words, the amount of penetration $Q_C$ in the base metals 1a and 1b at the center portion of electrode 3 becomes less than the amount of penetration $Q_E$ near the ends. With an electrode width of 750 mm, $Q_C/Q_E$ is zero, or $Q_C = 0$, thus indicating that inadequate coalescence is produced in the center portion of electrode 3. With this procedure, 750 mm thick workpieces 1a and 1b were weld united using a 750 mm thick electrode 3, and a weld zone was obtained as shown in section in the macrograph of FIG. 5. Inadequate coalescence can be observed at the center portions of the base metals 1a and 1b opposite the center portion of the electrode 3.

In an attempt to eliminate this possibility of inadequate coalescence, an improved electroslag welding process has been disclosed in U.S. Pat. No. 3,575,567. The process of this U.S. patent is characterized in that, in performing electroslag welding with an electrode of the plate type having a width of more than 300 mm, at least that portion of the plate electrode which is to be consumed by the welding operation is divided, by vertical lines extending parallel to both side edges, into a plurality of sections, and these sections are combined in tandem or electrically short-circuited relative to each other, to form an electrode unit, which unit is connected to one terminal of the welding power source.

As an example of the process of U.S. Pat. No. 3,575,567, FIGS. 6a and 6b illustrate the welding conditions for base metals 11a and 11b having a thickness of 750 mm using a tri-sected electrode comprising sections 12a, 12b and 12c. As can be seen particularly from FIG. 6b, the 750 mm-thick base metals 11a and 11b have their adjacent edges arranged to define a gap of 35 mm therebetween, and the sections 12a, 12b and 12c of the plate-shaped electrode are inserted into the welding gap defined by the base metals. This welding gap is further defined by end strips 13a and 13b applied to opposite sides of the base metals 11a and 11b. Welding current is supplied from a welding power source 14 to the plate electrode and to the base metals so that the heat created by the resistance of molten slag 15 can melt both the adjacent portions of the base metals 11a and 11b and the electrode sections 12a, 12b and 12c, resulting in their coalescence as weld metal. In FIG. 6a, the molten metal is indicated at 16 and the solidified deposited metal is indicated at 17.

Since base metals 11a and 11b have the same thickness of 750 mm, the electrode sections 12a, 12b and 12c have a width of approximately 243 mm each. The other welding conditions were the same as described above for FIGS. 1a – 4. It would be noted that FIG. 6b is a sectional view taken along the line VIb—VIb of FIG. 6a. A photograph of the macrostructure of the weld zone thus obtained is illustrated in FIG. 7. As compared with the photograph, shown in FIG. 5, of the macrostructure of the weld zone obtained with respect to FIGS. 1a – 4, it will be noted that the penetration in the center portions of base metals 11a and 11b is greater, and that a sound weld zone is obtained without any inappropriate coalescence. Nevertheless, the process is not entirely free of drawbacks.

As illustrated in FIG. 7, and despite the fact that the welding was performed with a trisected electrode in conformance with the disclosure of U.S. Pat. No. 3,575,567, the ratio of the average penetration $Q_C$ in the center portions of the base metal to the average penetration $Q_E$ in the portions near both ends of the base metal, or $Q_C/Q_E$, was 0.84. Thus, the penetration in the center of the parent metal was slightly smaller than in the near-end portions. This drawback is more pronounced with an increase in the thickness of the base metal, as will be clear from the results using a trisected electrode as represented by the curve B in FIG. 3. The drawback can develop into improper coalescence at the center portion of the base metal.

SUMMARY OF THE INVENTION

The present invention is directed to perfecting the process disclosed in U.S. Pat. No. 3,575,567 by eliminating the drawbacks thereof. To this end, the present invention involves an electroslag welding process in which welding is performed with a plate-shaped electrode so formed that at least that portion thereof to be consumed by the welding operation is divided, along vertical lines parallel to the opposite edges thereof, into a plurality of sections, and the section opposite the thick middle part of the base metal is made thicker than the other sections. Thereby, an ideal coalescence can be effected, without the danger of any improper fusion, in the center part of the base metal.

An object of the invention is to provide an improved electroslag welding method or process employing at least one metal plate electrode inserted into a welding gap between opposed surfaces of base metals to be weld united, to form at least part of the weld.

Another object of the invention is to provide such an electroslag welding method or process in which, with respect to each electrode, that portion of the electrode length to be consumed by welding is separated into a plurality of substantially equal width sections spaced laterally from each other and with the center portion of the width of the electrode having a thickness in excess of the thicknesses of the end portions of its width.

A further object of the invention is to provide an electro-slag welding arrangement for performing the method.

For an understanding of the principles of the invention, reference is made to the following description of a typical embodiment thereof as illustrated in the accompanying drawings.

BRIEF DESCRIPTION OF THE DRAWINGS

In the Drawings:

FIGS. 1a and 1b are somewhat diagrammatic sectional views illustrating conventional electroslag welding using two different width electrodes of the plate type;

FIGS. 2a and 2b are sectional views of the weld zones obtained by the arrangements shown in FIGS. 1a and 1b, respectively.

FIG. 4 is a somewhat diagrammatic sectional view illustrating the penetration to the base metal;

FIG. 6b is a section taken on the line VIb—VIb of FIG. 6a;

FIG. 8b is a sectional view taken on the line VIIIb—VIIIb of FIG. 8a;

DESCRIPTION OF THE PREFERRED EMBODIMENT

Figure 8A:
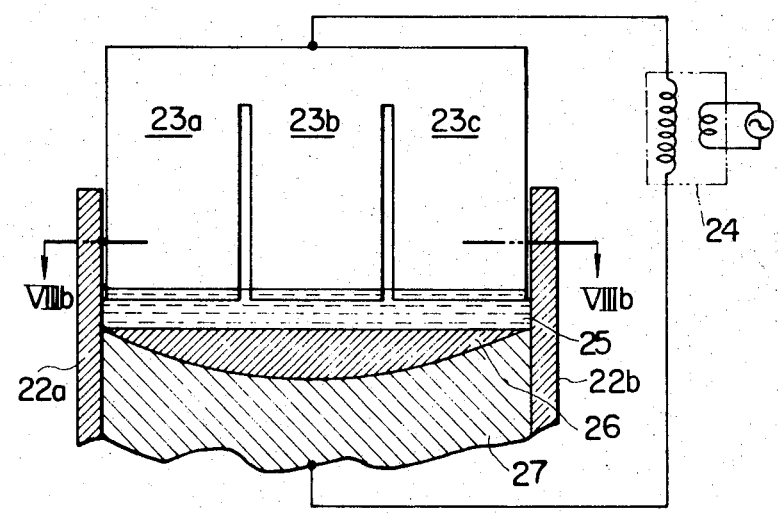
FIG. 8a is a somewhat schematic vertical sectional view illustrating an embodiment of the present invention.

The invention is illustrated, by way of example, in FIGS. 8a – 12. Referring specifically to FIGS. 8a and 8b, base metals 21a and 21b, each having a thickness of 750 mm, are arranged with their adjacent edges spaced to provide a welding gap of 35 mm therebetween. A plate-shaped electrode, divided into three equal sections 23a, 23b and 23c is inserted into the welding gap defined between the base metals 21a and 21b and end strips 22a and 22b. Each of the sections 23a, 23b and 23c has a width of approximately 243 mm, and the spacing between adjacent sections is 10 mm. The plate-shaped electrode sections 23a, 23b and 23c are united in one piece at their upper portions, and are commonly connected to one terminal of a welding power source 24, whose opposite terminal is connected to the base metals. Molten slag, which produces a heat by its resistance to the welding current, is indicated at 25, the molten metal is indicated at 26, and the solidified weld metal is indicated at 27.

Figure 8B:
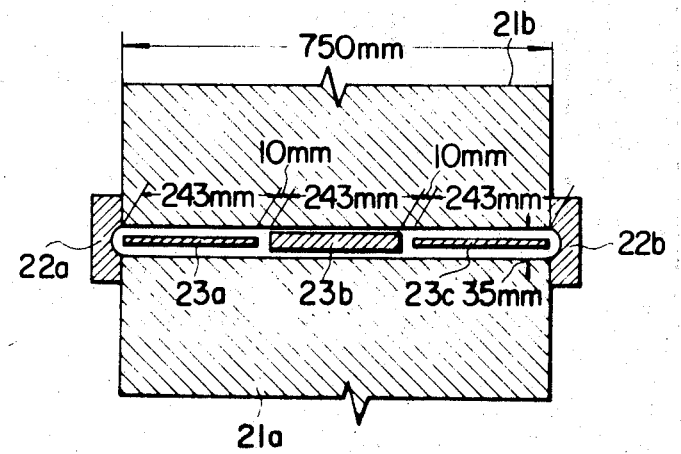
Figure 9:
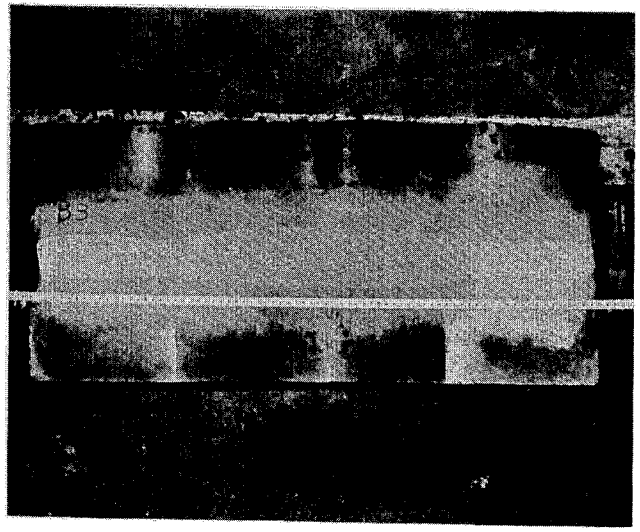
FIG. 9 is a photograph of a section of the weld zone obtained in accordance with the embodiment of the invention shown in FIGS. 8a and 8b.
Figure 11:
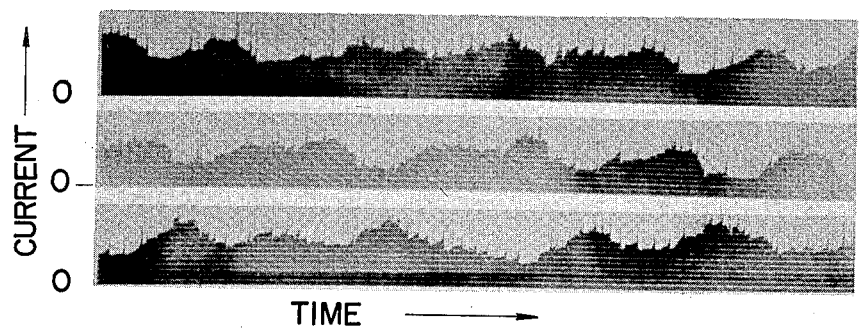
FIG. 11 is a graphic illustration of oscillograms indicating the changes, with time, of the intensity of currents flowing through the individual electrode sections in the embodiment of the invention shown in FIGS. 8a and 8b.
Figure 10:
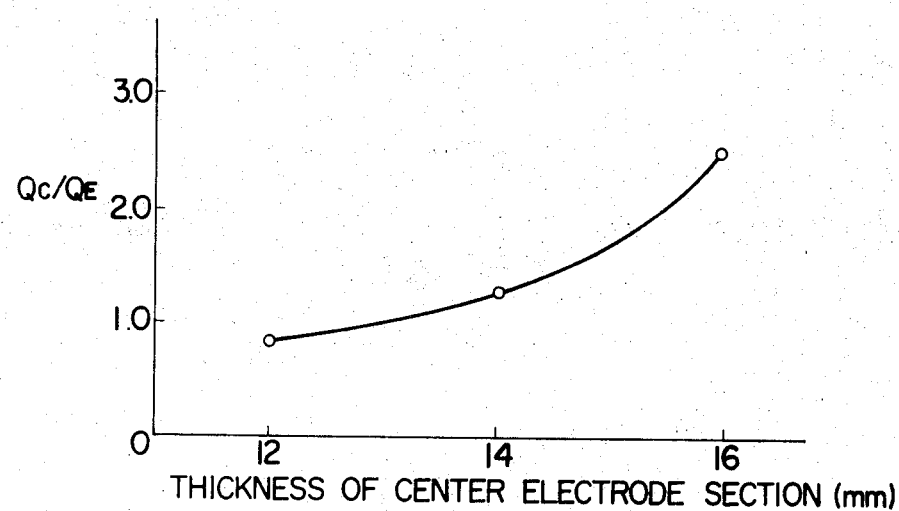
FIG. 10 is a graph illustrating the relation between the thickness of the center electrode portion and the penetration into the parent metal attained in accordance with the present invention.

The plate thicknesses of the electrode sections 23a, 23b and 23c are indicated in FIG. 8b, from which it will be noted that electrode sections 23a and 23c have the same thickness $t_1 = 12$ mm, and section 23b has the thickness $t_2 = 16$ mm. As shown in FIG. 9, which is a photograph of the macrostructure of the resulting weld zone, the magnitude of penetration increases toward the middle portions of the base metals 21a and 21b, so that there is no possibility of improper coalescence occurring at the middle portions of the base metals.

Figure 3:
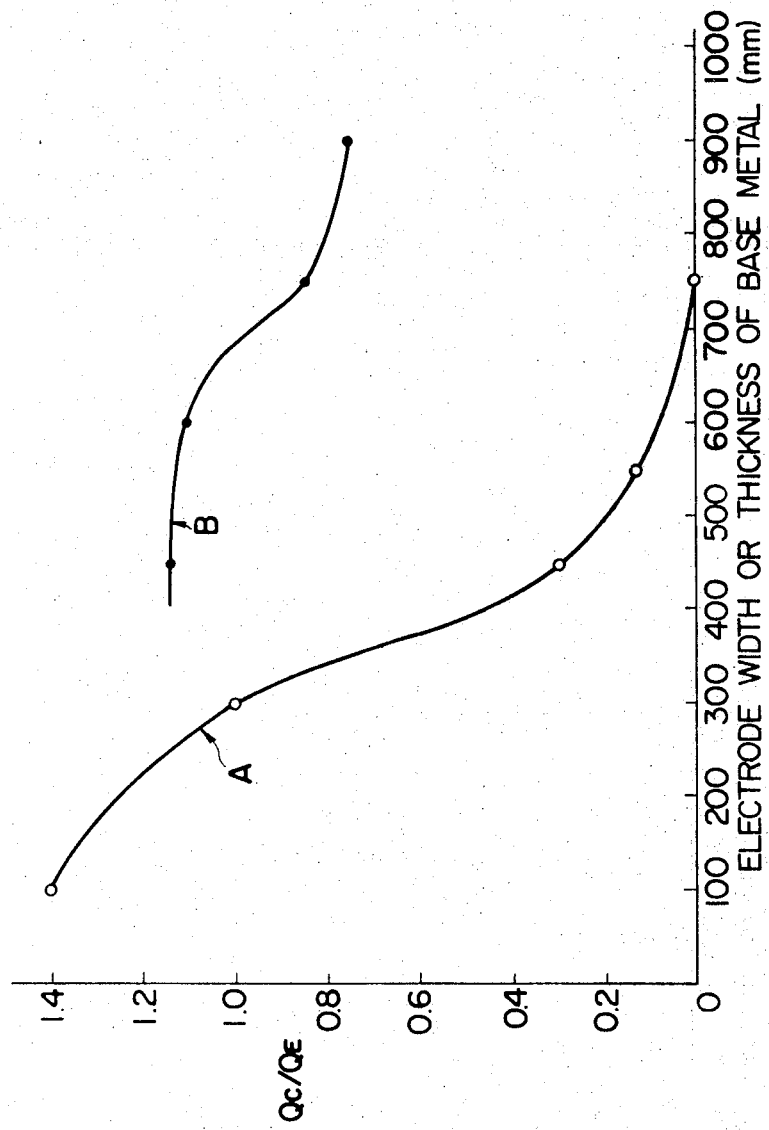
FIG. 3 is a graph illustrating the relation between the electrode width, or the thickness of base metal, and the degree of penetration to the base metal in the procedures illustrated in FIGS. 1a and 1b.
Figure 5:
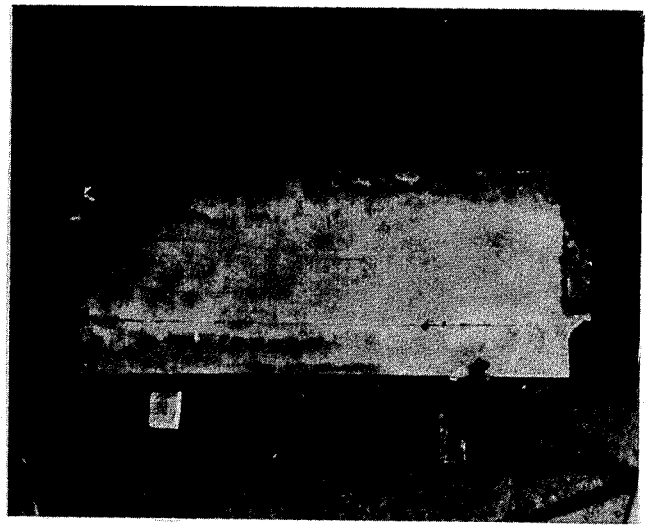
FIG. 5 is a photograph of a section of the weld zone formed by the procedure of FIGS. 1a and 1b.
Figure 7:
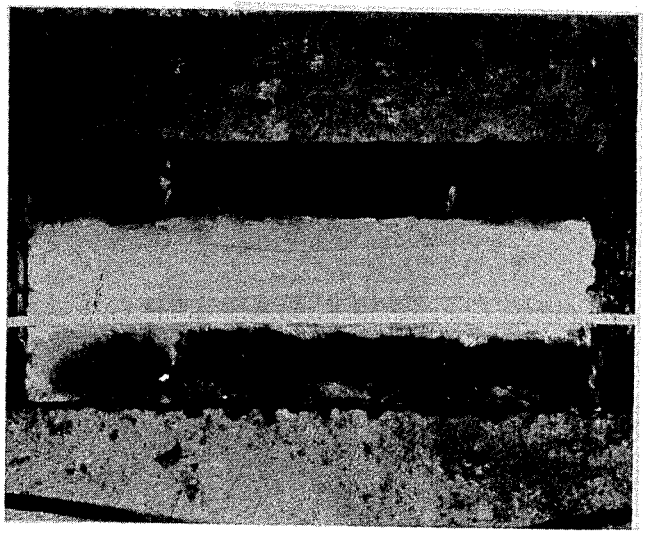
FIG. 7 is a photograph of a section of the weld zone obtained in accordance with the procedure illustrated in FIGS. 6a and 6b.
Figure 6A:
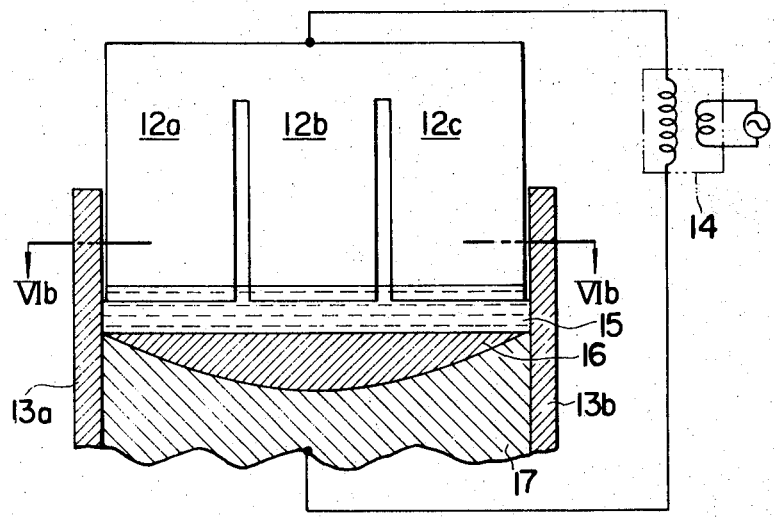
FIG. 6a is a somewhat diagrammatic vertical sectional view illustrating a conventional electroslag welding process using a trisected plate-shaped electrode.
Figure 6B:
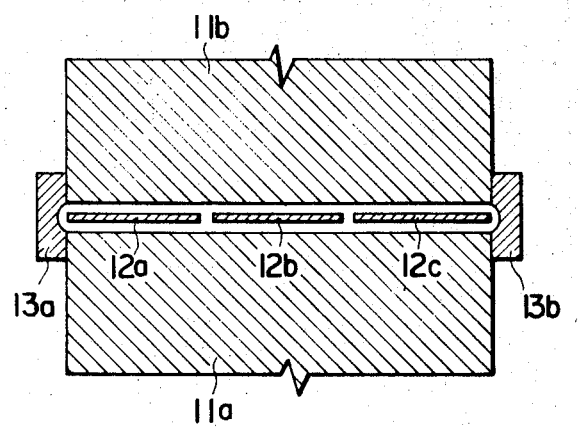

Through experiments in which the plate thickness $t_1$ of electrode sections 23a and 23c was kept constant at 12 mm, with the thickness of the center electrode section 23b having various magnitudes such as 12 mm, 14 mm and 16 mm, $Q_C/Q_E$, or the ratio of the penetration $Q_C$ of the center part of the base metal to the penetration $Q_E$ of the end portions, were determined. These results are graphically illustrated in FIG. 10 from which it will be noted that, when the plate thickness $t_1$ of electrode sections 23a and 23c is 12 mm and the thickness $t_2$ of the center electrode 23b is also 12 mm, and in the same manner as illustrated in FIG. 5, $Q_C/Q_E$ is 0.84, and penetration in the center portions of the parent metal decreases. If the thickness $t_2$ of center electrode section 23b is 14 mm, and thus greater than that of the adjacent electrode sections 23a and 23c, then $Q_C/Q_E$ is 1.25. Similarly, if the thickness $t_2$ of electrode section 23b is 16 mm, then $Q_C/Q_E = 2.50$.

Thus, as the thickness of the electrode section 23b opposite the center portion of the base metal exceeds the thickness of the adjacent electrode sections 23a and 23c, the penetration to the center part of the base metal increases, thereby precluding the risk of producing inappropriate coalescence, as already noted.

The difference between the common thickness of electrode sections 23a and 23c and that of electrode section 23b is desirably in the range from 2 mm to 4 mm. Any difference outside this range is not desirable because it may lead to an excessive penetration at the thicker electrode section 23b as contrasted with a reduced penetration of the thinner electrode sections 23a and 23c. Also, the suitable width in which the thickness of electrode section 23b may be increased is between one-half and one-sixth of the combined width of the electrode sections 23a, 23b and 23c, which is approximately 750 mm in the exemplary embodiment of the invention.

FIGS. 11a, 11b and 11c are oscillograms illustrating changes, with time, of the currents flowing through electrode sections 23a, 23b and 23c, respectively, in the illustrative embodiment. Since the electrode sections are short-circuited relative to each other, the total magnitude of the currents flowing through them at a given time is, in the form of a connected current, almost constant. As illustrated, the currents are distributed among the electrode sections 23a, 23b and 23c. The changes, with time, of these currents were determined experimentally with both end electrode sections 23a and 23c having a common thickness $t_1$ of 12 mm and the center electrode section 23b having a thickness $t_2$ of 12 mm, 14 mm and 16 mm. Additionally, and on the basis of the results thus obtained, the ratio, namely the current integration ratio, of the sum total of current-time, namely current integrated by time, in the center electrode section 23b to the mean value of the sum totals of current-time in both end electrode sections was found. The relation between the two factors is graphically illustrated in FIG. 12.

If the values of the currents flowing through the respective electrode sections 23a, 23b and 23c are $Aa(t)$, $Ab(t)$ and $Ac(t)$, then the sum totals of current-time in the respective electrode sections are $\int Aa(t)dt$, $\int Ab(t)dt$, $\int Ac(t)dt$, and the current integration ratio is determined by the following formula:

$$\int Ab(t)dt / (\int Aa(t)dt + \int Ac(t)dt)/2$$

Figure 12:
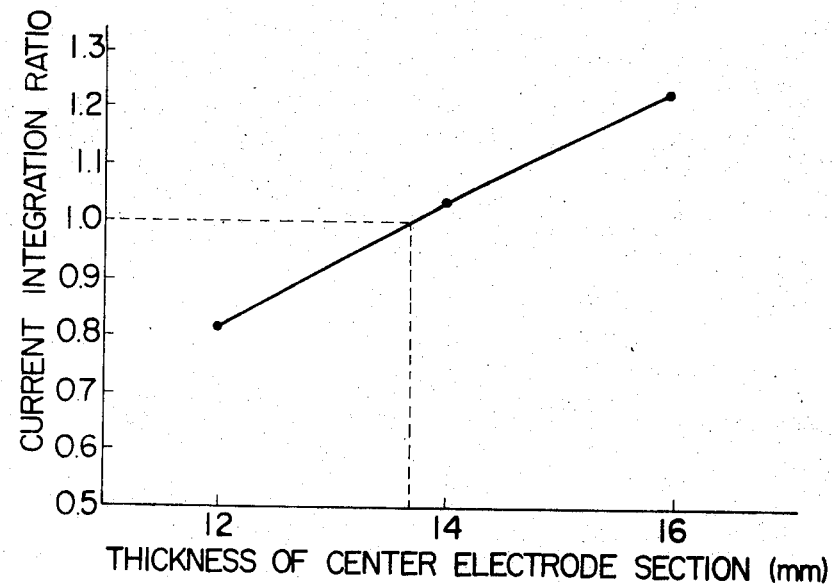
FIG. 12 is a graph illustrating the relation between the thickness of the center electrode section and the current integration ratio in the embodiment of the invention shown in FIGS. 8a and 8b.

From this formula, and also from FIG. 12, it will be appreciated that the current integration ratio rises as the plate thickness $t_2$ of center electrode section 23b increases, the ratio being 1.0 with $t_2$ being equal to 13.9 mm. Beyond this value, the sum total of the current-time of the center electrode section 23b exceeds those of the adjacent electrode sections 23a and 23c so that, as already noted, the penetration at the center portion of the base metal is intensified with an increase in the thickness of the electrode section 23b.

From the foregoing, it will be clear that, in accordance with the present invention, a plate electrode is divided, for example trisected, into a plurality of subelectrodes or electrode sections with respect to the thickness of base metal to be welded. Such electrode sections are partly united or are electrically connected to each other at their upper portions, so that the assembly may be used as a single electrode. The electrode section opposite the center portion of the base metal is thicker than the adjacent sections, so that the degree of penetration in the center portion of the base metal is increased whereby electroslag welding can be performed in an ideal manner without the danger of producing any improper coalescence at the center portion of the base metal.

Thus, the present invention provides an electroslag welding process in which the welding is performed with a plate-shaped electrode so formed that at least that electrode portion to be consumed by welding is divided along vertical lines parallel to both edges thereof into a plurality of sections, and the section opposite the thick middle portion of the base metal is made thicker than the other sections, whereby the penetration in the middle part of the base metal, facing the thick center electrode section, is increased and good coalescence is produced.

While a specific embodiment of the invention has been shown and described in detail to illustrate the application of the principles of the invention, it will be understood that the invention may be embodied otherwise without departing from such principles.

What is claimed is:

1. In an electroslag welding method employing at least one metal plate electrode having a center portion and two end portions inserted into a welding gap between opposed surfaces of base metals to be welded united and substantially parallel thereto, to form at least part of the weld, the improvement comprising, (a) with respect to each electrode, separating at least that portion of the electrode length to be consumed by welding into a plurality of substantially equal width sections spaced laterally from each other, with said center portion of the electrode's width having a thickness in excess of the thicknesses of each of said end portions of the width of the electrode, the thickness of said center portion of the width of each electrode being greater than the thicknesses of said end portions by about 2mm to about 4mm when the overall width of the electrode is substantially about 750 mm with the gap between sections of the electrode being about 10 mm and the welding gap between said opposed surfaces being about 35 mm; and (b) commonly electrically connecting all of the sections of each inserted electrode to the same respective single terminal of a welding power source capable of producing a current of the order of three thousand amperes at a voltage of about 50 volts.

2. In an electroslag welding method, the improvement claimed in claim 1, in which that portion of the length of each electrode to be consumed by welding is separated into three substantially equal width sections spaced laterally from each other.

3. In an electroslag welding method, the improvement claimed in claim 1, in which the thicknesses of the respective end portions of the width of the electrode are equal to each other.

4. In an electroslag welding method employing at least one metal plate electrode having a center portion and two end portions inserted into a welding gap between opposed surfaces of base metals to be welded united and substantially parallel thereto, to form at least part of the weld, the improvement comprising, (a) with respect to each electrode, separating at least that portion of the electrode length to be consumed by welding into a plurality of sections spaced laterally from each other, with said center portion of the electrode's width having a thickness in excess of the thickness of each of said end portions of the width of the electrode, the thickness of said center portion of the width of each electrode being greater than the thicknesses of said end portions by about 2mm to about 4mm when the overall width of the electrode is substantially abut 750 mm with the gap between sections of the electrode being about 10mm and the welding gap between said opposed surfaces being about 35 mm and in which the width of the center portion of each electrode is from about one-half to about one-sixth the overall width of the electrode; and (b) commonly electrically connecting all of the sections of each inserted electrode to the same respective single terminal of a welding power source capable of producing a current of the order of three thousand amperes at a voltage of about 50 volts.

* * * * *